United States Patent [19]

Carroll et al.

[11] Patent Number: 5,038,033
[45] Date of Patent: Aug. 6, 1991

[54] METHOD AND APPARATUS FOR DETECTING AND QUANTIFYING RADIOACTIVE MATERIAL ON TUBING IN A BOREHOLE

[75] Inventors: James F. Carroll, Lafayette, La.; Hugh D. Scott, Katy, Tex.

[73] Assignee: Schlumberger Technology Corporation, Houston, Tex.

[21] Appl. No.: 481,134

[22] Filed: Feb. 16, 1990

[51] Int. Cl.$^5$ .......................... G01V 5/04; G01V 9/00
[52] U.S. Cl. .................................... 250/256; 166/247; 166/250
[58] Field of Search ................ 250/256, 257; 166/247, 166/250, 902; 175/40, 41

[56] References Cited

U.S. PATENT DOCUMENTS

| | | | |
|---|---|---|---|
| 1,683,489 | 9/1928 | Rice | 166/250 X |
| 2,981,331 | 4/1961 | Arterbury | 166/250 |
| 3,436,957 | 4/1969 | Pridy | 166/250 X |
| 4,459,479 | 7/1984 | Smith, Jr. et al. | 250/256 |
| 4,504,736 | 3/1985 | Smith, Jr. et al. | 250/256 |
| 4,856,584 | 8/1989 | Seidner | 250/256 X |

OTHER PUBLICATIONS

"The Measurement of Natural Radioactivity in Scale and Products Arising in Oil & Gas Installations", Dr. D. Green, Tracerco Group of ICI Chemicals & Polymers Ltd. (Jun. 1990).
"Radioactivity Well Logging Anomalies", from John L. P. Campbell, The Petroleum Engineer, Jun. 1951, pp. B-7 to B-12, See Page B-7, column 2, line 21 to column 3, line 18.
"Radioactive-Scale Formation", from A. L. Smith, Journal of Petroleum Technology, Jun. 1987, pp. 697-706.
"Natural Radioactive Scale: The Development of Safe Systems of Work", from I. M. Waldram, Journal of Petroleum Technology, Aug. 1988, pp. 1057-1060.

Primary Examiner—Constantine Hannaher
Assistant Examiner—Edward J. Glick
Attorney, Agent, or Firm—Henry N. Garrana; Frederic C. Wagret

[57] ABSTRACT

In order to properly treat the tubing of an oil producing borehole, and prevent hazard to personnel at the oil production site, the contamination of tubing by the formation of scale or radioactive deposits on the inner wall thereof is determined by measurement of the low-level radiation emitted by the scale and calculation of the radiation level which would be detected in the vicinity of the outer wall of the tubing in the absence of contributions by the radioactivity of surrounding earth formations. This is accomplished by a logging tool and method which includes a sonde which includes a detector and is lowered in the tubing to detect and count the gamma rays emitted by the scale or radioactive deposits at different depths in the borehole tubing. Data processing determines the radioactivity level within the tubing from the measured gamma rays, and calculates from that level the level of radioactivity which would have been detected outside and in the vicinity of the tubing by applying a first tubing thickness attenuation factor. In a preferred embodiment, data processing corrects for the natural background radioactivity level by subtracting a reference natural radio activity level, itself corrected for tubing thickness by applying a second tubing thickness attenuation factor.

27 Claims, 4 Drawing Sheets

U.S. Patent   Aug. 6, 1991   Sheet 1 of 4   5,038,033
FIG. 1
FIG. 2
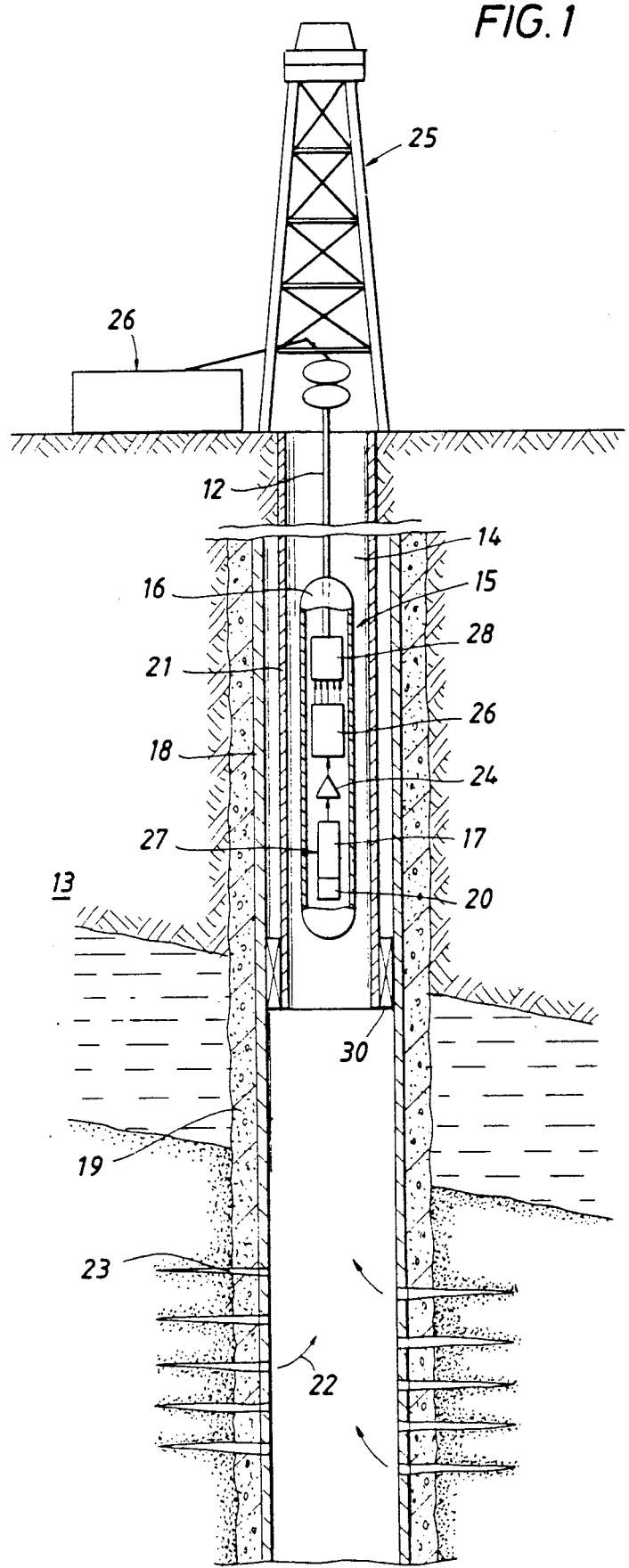
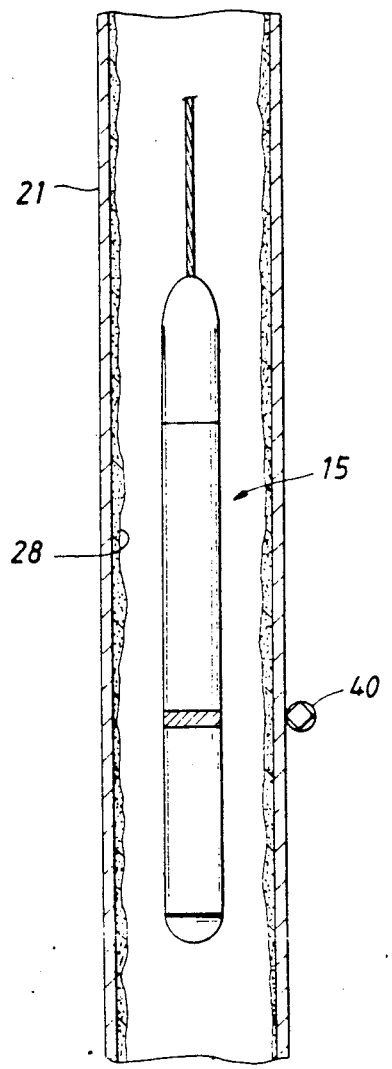

FIG.5A
FIG.5B
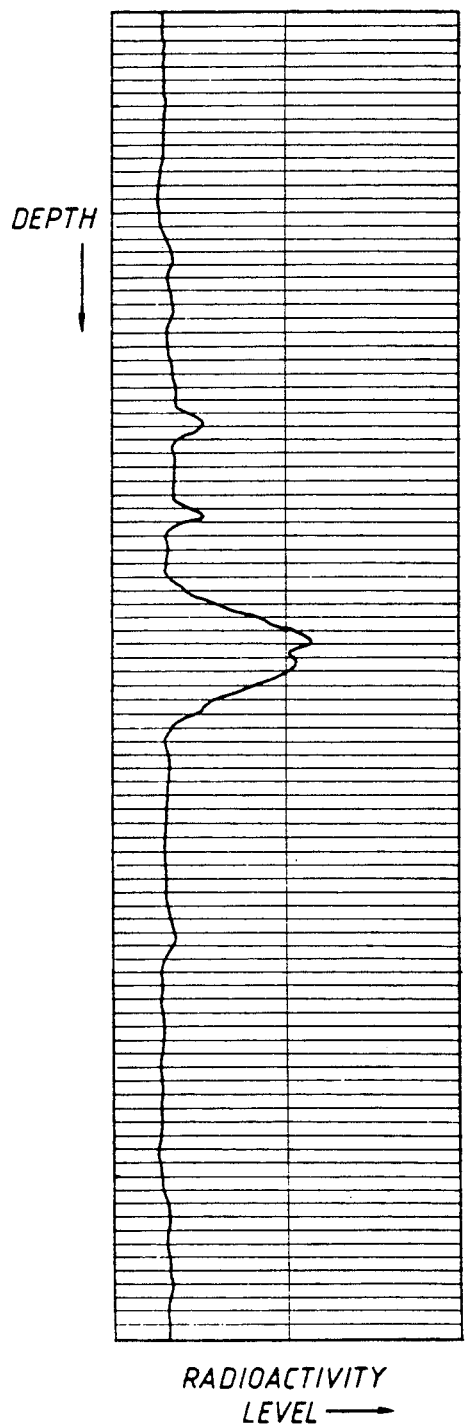
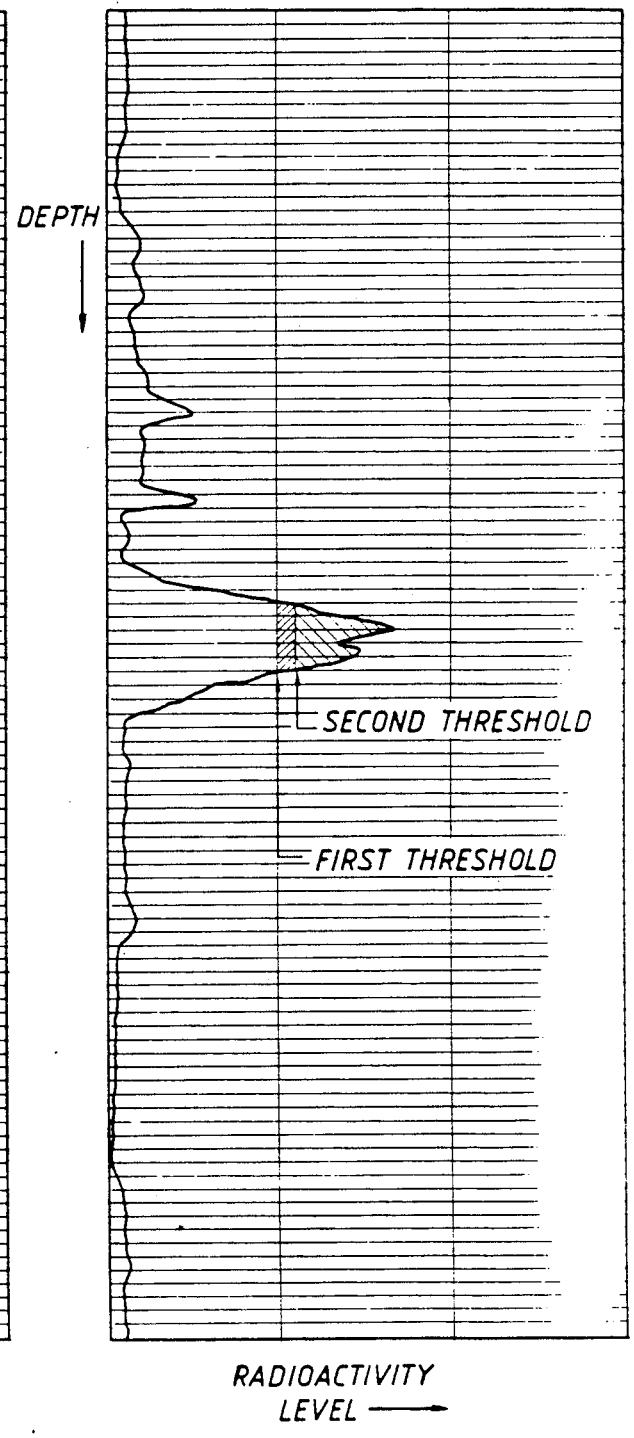
DEPTH
DEPTH
SECOND THRESHOLD
FIRST THRESHOLD
RADIOACTIVITY LEVEL ⟶
RADIOACTIVITY LEVEL ⟶

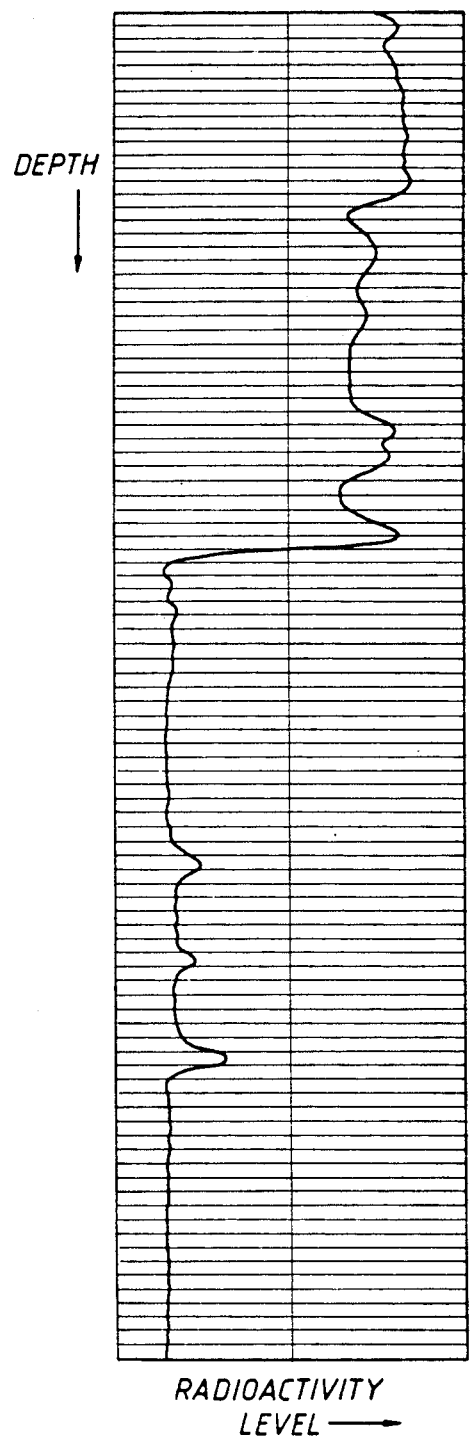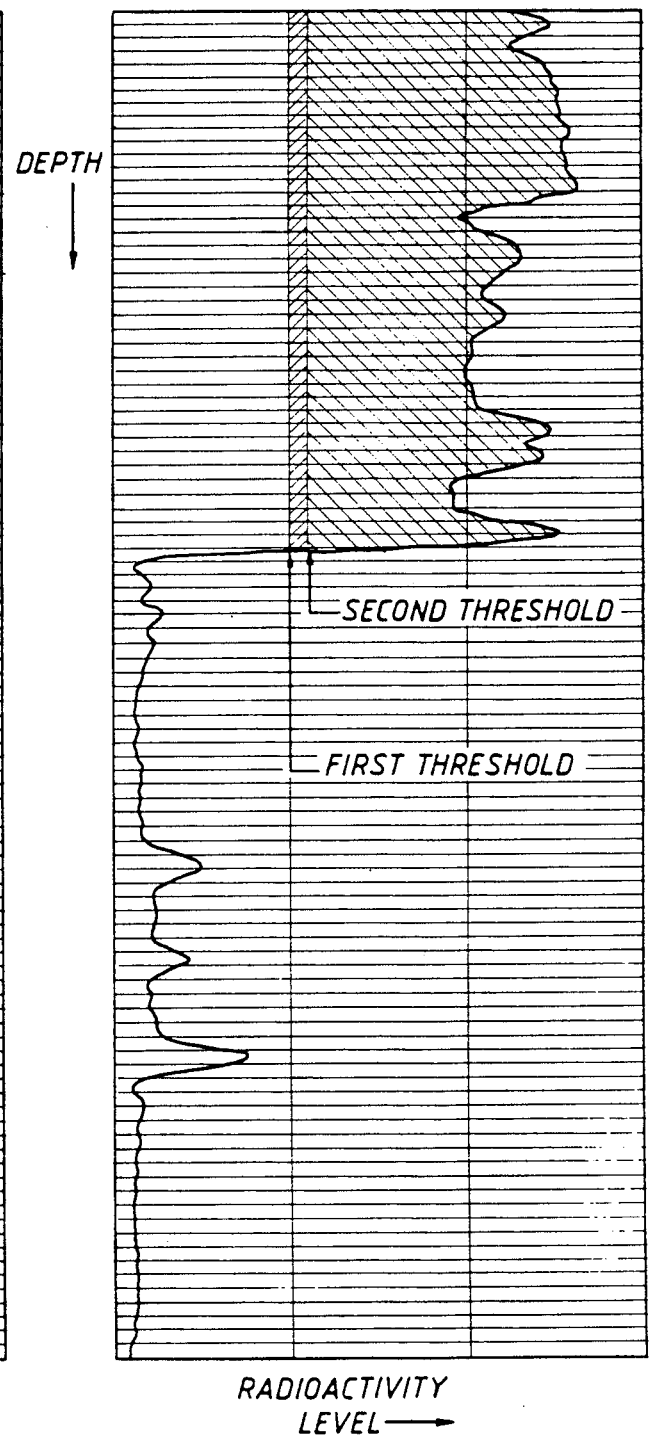

METHOD AND APPARATUS FOR DETECTING AND QUANTIFYING RADIOACTIVE MATERIAL ON TUBING IN A BOREHOLE

BACKGROUND OF THE INVENTION

1. Field of the invention

The present invention relates to a method and an apparatus for use in a borehole, and more particularly, for carrying out nuclear measurements in a tubing of an oil producing borehole.

2. Description of the related art

As known in the art of logging techniques, a well which has been determined to be promising for oil production, is provided with a metallic casing, and cement is injected between the earth formation and the casing. Perforations are then made through the casing/cement and in the oil productive formation, so as to allow oil to flow up to the surface through a tubing beforehand arranged in the well coaxially to the casing.

It is common that oil comes up to the surface mixed with water from the formations or with water injected in the formation. As a matter of fact, water is sometimes used for enhancing the oil production in so-called "water-drive" reservoirs, wherein water is injected in the formations producing oil through wells located in the vicinity of the oil well, in order to increase the pressure in the productive formations. Water from the formations, or water injected in water-drive reservoirs, usually contains different dissolved salts which regularly become deposited on the inside wall of the production tubing as well as of the surface production equipment. These deposits, called "scales" in the oilfield production business, include sulfates such as barium, strontium or calcium, or carbonates such as calcium or iron. The scales form a layer the thickness of which increases with time, up to the point where the scales may eventually clog the production pipes and equipment.

Thus, there is a growing interest in the oilfiled production business for detecting and quantifying these scales.

Furthermore, these scales generally include radioactive components such as radium-226 from the uranium decay series or radium-228 from the thorium decay series. The protection of people who have to work in the vicinity of such contaminated equipment raises a first concern. A second concern comes from the fact that tubings are pulled out of old wells which are no longer productive, and are submitted to specific treatments so as to be re-usable. Due to the presence of radioactive scales, the removal from the well, the transportation and the treatment of the contaminated tubings is accordingly substantially complicated. Specific precautions have to be taken during each of these steps. More particularly, the contaminated tubings can only be treated in a limited number of authorized locations. A further issue is the determination of whether a tubing is contaminated or not, and, in the affirmative, to what extent. These issues are of great concern as mentioned in the two following papers: "Radioactive-Scale Formation" from A. L. Smith, published in Journal of Petroleum Technology, June 1987, pages 697–706, and in "Natural Radioactive Scale: The Development of Safe Systems of Work" from I. M. Waldram, published in the Journal of Petroleum Technology, August 1988, pages 1057–1060. These papers provide detailed information about the formation of radioactive scales, as well as information on the methods and means, available so far, to detect and measure such scales. Up to the present time, according to applicant's knowledge, there is no available straightforward and accurate method allowing such determination. The known methods and apparatus generally consist in an adaptation of existing gamma radiation meters used in other application areas, such as laboratories and hospitals.

These known apparatus are generally not sensitive enough to detect the relatively low-level radiation emitted by scales. Attempts have been made to overcome this difficulty by increasing the size of the detecting apparatus. However, this leads to bulky devices.

Furthermore, the known apparatus are relatively fragile and may be easily damaged in the severe environment of an oil production site, especially offshore.

Moreover, the known apparatus require special skills from the operator for the operating step as well as for the interpretation of the results.

Finally, since the radioactivity is measured from the outside of the tubing, these measurements can only be carried out once the tubing has been pulled out of the well. Nevertheless, there are instances where the tubing is so contaminated that it cannot, from an economical standpoint or for other reason, be decontaminated and then has to be either put back down in the well or transported to some specific locations for burial. Since these operations are very expensive, it would often be cheaper and easier to leave the tubing in the well, as long as there is no bar from the environmental regulations in force at the well location. Accordingly, it would be more appropriate to carry out the radioactive measurements inside the tubing while it is still in the well, instead of outside the tubing once it is pulled out of the well. However, the concerned people are interested in knowing the radioactivity level present outside the tubing to determine whether the tubing is a hazard if removed from the well. The known methods and apparatus do not provide any answer to the problem of detecting and quantifying the radioactivity level of a tubing disposed in a well and providing data on the radioactivity level outside the tubing.

According to the above, there is a need for a method and a tool for detecting and determining the radiation level of scales deposited on the wall of tubing.

SUMMARY OF THE INVENTION

It is an object of the invention to provide a method and apparatus for detecting and quantifying radioactive material (scales) deposited on the wall of tubing, while the tubing is in the well, and more particularly for determining whether the tubing might constitute a hazard.

The foregoing and other objects are attained in accordance with the invention by a method for detecting and quantifying radioactive material deposited on the wall of a tubing disposed in a borehole, including the step of:

1) detecting radiation emitted by the radioactive material by lowering in the tubing a logging tool provided with gamma ray detector means; and 2) calculating, from the radiation level detected in the tubing, the radioactivity level which would be detected outside and in the vicinity of the tubing.

The method also comprises the step of converting the measured radioactivity level from logging API unit to microrem/h or counts per unit of time.

The method includes correcting the measured radioactivity level for the attenuation due to the tubing, by applying to the measured radioactivity level a first tubing attenuation factor. A set of tubing thickness attenuation factors is determined for different tubing thicknesses, from which is derived a general relationship between the tubing attenuation factor and the tubing thickness.

The method advantageously includes the step of correcting the measured radioactivity level for the natural background radioactivity of the earth formations surrounding the borehole, by subtracting, from the measured radioactivity level, a reference radioactivity level, for each depth.

For example, the reference radioactivity level is obtained from one of the following sources:

natural radioactivity level measured in the tubing prior to water/oil production, i.e. prior to any scale deposit; or natural radioactivity level measured in a casing disposed in the borehole prior to any water/oil production, i.e. prior to any scale deposit; or natural radioactivity level measured in the open borehole; or assumed or estimated radioactivity level.

In a preferred embodiment, the reference radioactivity level is corrected for tubing attenuation thickness by applying a second tubing attenuation factor.

Advantageously, the method comprises the step of recording the radioactivity level versus depth in the borehole.

More particularly, a first threshold radioactivity level is chosen as a hazard level of radioactivity.

In a preferred embodiment, only the radioactivity level between the first threshold and a second threshold are corrected for natural background radioactivity.

The invention also contemplates an apparatus for detecting and quantifying radioactive material deposited on a tubing disposed in a borehole, comprising:

1- a logging tool, adapted to be lowered in the tubing, and comprising means for detecting and counting radiation emitted by the radioactive material;

2- means for determining, from the measured radiation, a measured radioactivity level; and 3- means for calculating, from the measured radioactivity level, the radioactive level which would be detected outside and in the vicinity of the tubing.

The apparatus preferably further comprises means for converting the radioactivity level from logging API units to microrem/h or counts per unit of time.

Advantageously, the apparatus comprises means for correcting the measured radioactivity level for the tubing thickness, including means for determining a first tubing attenuation factor for a given tubing thickness.

The apparatus advantageously includes means for correcting the measured gamma rays for the natural background radioactivity of the earth formations surrounding the borehole, including means for subtracting, from the measured radioactivity level, a reference radioactivity level.

For example, the reference radioactivity level is obtained from one of the following sources:

natural radioactivity level measured in the tubing prior to water/oil production, i.e. prior to any scale deposit;

natural radioactivity level measured in a casing disposed in the borehole prior to any water/oil production, i.e. prior to any scale deposit; or natural radioactivity level measured in the open borehole; or assumed or estimated natural radioactivity level.

The apparatus further includes means for applying to the reference radioactivity level a second tubing attenuation factor.

Advantageously, the apparatus further comprises means for recording the radioactivity level of the scales versus depth in the borehole.

In a preferred embodiment, the means for correcting for natural background radioactivity are used only for the radioactivity levels which are between a first threshold level and a second threshold level.

The characteristics and advantages of the invention will appear better from the description to follow, given by way of a non limiting example, with reference to the appended drawing in which:

BRIEF DESCRIPTION OF THE DRAWINGS

FIG. 1 is a schematic side view of an embodiment of the invention in the form of a logging tool suspended in a well;

FIG. 2 is a sketch showing the logging tool according to the invention in a tubing on the inside wall of which scales are deposited;

FIGS. 5A, 5B, 6A and 6B are examples of logs showing the variations of radioactivity level as a function of depth in a borehole.

DESCRIPTION OF THE PREFERRED EMBODIMENT

Figure 3:
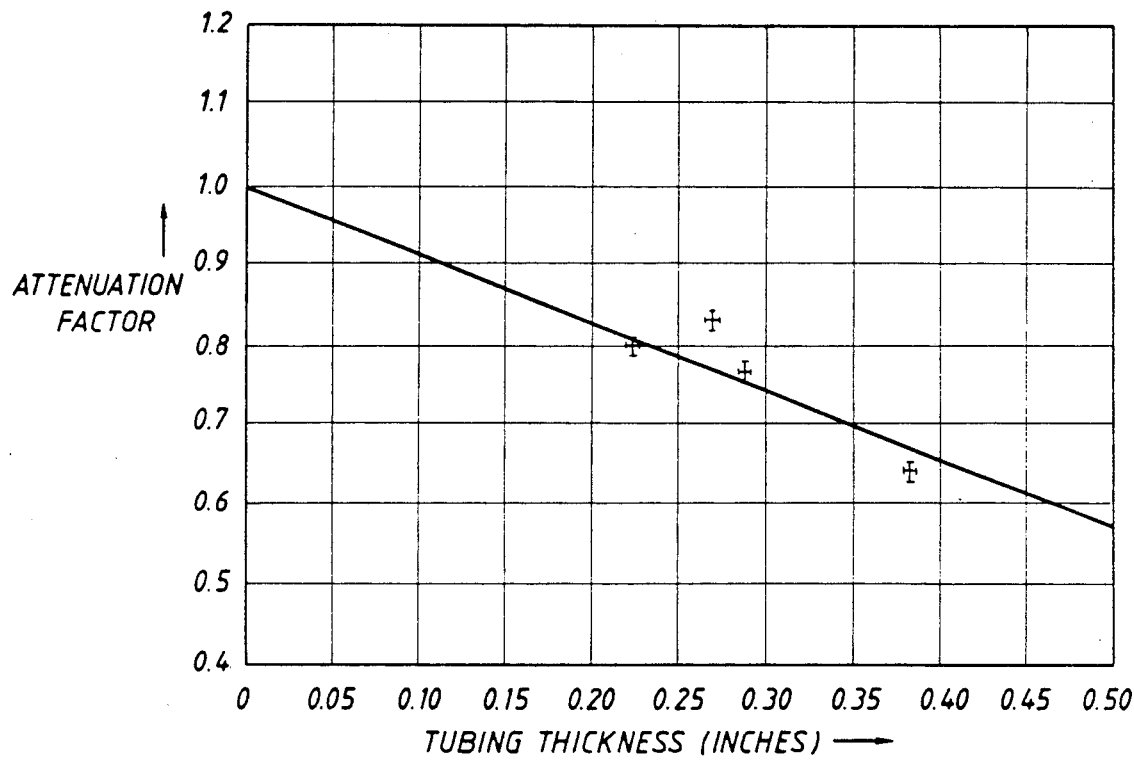
FIG. 3 is a plot of the first tubing thickness attenuation factor as a function of the tubing thickness.

Referring now to FIG. 1, according to the invention, a logging sonde 15 is shown suspended by a cable 12 within a borehole 14 surrounded by earth formations 13. The borehole 14 has a conventional casing 18 disposed on the interior surface of the borehole. The annular space between the casing 18 and the inside wall of the borehole 14 is filled with cement 19. A tubing 21, coaxial to the casing 18, is disposed in the borehole 14. A packer 30 is disposed at the lower end of the tubing 21 to isolate the annular space between the casing 19 and the tubing 21. Perforations 23, as known in the art, are made in the cement/casing, in a zone of the borehole disposed below the bottom of the tubing 21. Hydrocarbons fluids, shown by arrows 22, flow from productive earth formations through the perforations 23 into the borehole 14 and through the tubing 21 towards the surface. It is frequent that water coming from one or more earth formations layer(s) mixes with oil in the borehole and the tubing 21. A derrick 25 and surface equipment, symbolized by the block 26, are provided at the surface. The sonde 15 comprises an elongated housing 16 in which is disposed a gamma ray detector 27 that includes a scintillator crystal 20 and a photomultiplier 17. The gamma ray detector 27 is known in the art and may include a scintillator 20 made of sodium iodide (NaI Tl or bismuth germanate (BGO). The output of the gamma ray detector 27, after amplification by amplifier 24, is applied to an electronic circuitry 26 designed to measure the number of the gamma rays incident upon the detector 27. The signals issued from the circuitry 26 are transmitted to the surface through the cable 12 via a transmitter 28 disposed in the sonde 16. Signals are received at the surface by a receiver (known per se) and then otherwise processed and recorded in the surface equipment 26. Suitable techniques for performing these transmission and process functions are well known, and, therefore, these devices need not be further described.

The logging sonde 15 may be e.g. of the type known in the art, such as the NGS tool, mark of Schlumberger Technology Corp, and described in U.S. Pat. Nos. 3,976,878 or 4,096,385. Alternately, the sonde might be of the type described in U.S. Pat. No. 3,786,267. More details concerning the general arrangement of the sonde 15 can be found in these patents, all three assigned to Schlumberger Technology Corporation, and which are all incorporated herein by reference.

As shown schematically on FIG. 2, and according to the invention, the logging sonde 15 is lowered in the borehole 14 through the tubing 21 in order to detect and measure the radioactivity level measured at 40 of radioactive scales 28 which might be deposited on the wall of the tubing 21. The measured radioactivity level is transformed from nuclear logging units, API, to units used in the nuclear radiation field, such as microrem per hour or counts per unit of time. Furthermore, the method of the invention allows one to compute the radioactivity level which would be measured outside and in the vicinity of the tubing 21. This permits one to determine whether the tubing could be considered as a hazard.

To this end, the radioactivity level measured by the logging sonde 15 inside the tubing 21 is corrected to take into account the attenuation due to the tubing. This attenuation phenomenon depends on the thickness of the tubing and on the density of the tubing material. The correction for the tubing thickness is carried out by multiplying the radioactivity level measured inside the tubing by a correction factor, called hereafter a first tubing thickness attenuation factor. The first tubing thickness attenuation factor is determined for different tubing thicknesses, for a given tubing material. This determination is carried out in a laboratory, preferably by using a gamma ray detector similar to the one used in the logging sonde 15. The next step is to determine, from the different values of the first tubing attenuation factor, a general relationship between the first tubing attenuation factor and the tubing thickness. It has to be noted that these measurements are carried out once and for all, for a given detector.

FIG. 3 shows a plot of a first tubing attenuation factor versus tubing thickness; the different values on the plot have been determined experimentally.

Here below is given the mathematical relationship between the tubing thickness "t" and the first attenuation factor "$CF_i$":

$$CF_i = 1.0 - K_1 t$$

where "$K_1$" is a constant for a given type of detector; "$K_1$"=0.86 in the example shown in FIG. 3.

The radioactivity level measured inside the tubing for each depth in the borehole is corrected by using the first tubing thickness attenuation factor, according to the tubing thickness, so as to obtain a corrected radioactivity level as measured from outside the tubing. Corrected radioactivity levels are transformed in microrem per hour and thus recorded as a function of depth. The different steps hereabove referred to, can be expressed in a mathematical form as:

$$\text{Corrected G (microrem/h)} = K_4 * G(API) * CF_i,$$

where "$K_4$" is a constant for the conversion from API units to microrem/h, "Corrected G" is the radioactivity level as corrected, "G(API)" is the radioactivity level as measured in API units, and "$CF_i$" is the first tubing attenuation factor. "$K_4$" is e.g. equal to 0.0937. FIG. 5A and FIG. 6A are respective examples of logs showing the variations of the radioactivity level versus depth. These plots constitute a vivid representation of the radioactivity level, and tell the user, by a quick look, the locations in the tubing where scales are deposited, if any.

The method according to the invention, by providing accurate and corrected radioactivity levels, further allows one to determine whether the tubing may constitute a hazard. In that respect, a tubing is a hazard if the radioactivity level of the scales is above a first threshold, such as e.g. 50 microrem per hour, corresponding to a threshold radioactivity level above which the tubing might constitute a danger to people, and thus has to be decontaminated or buried in specific locations. To summarize, any zone of the tubing showing a radioactivity level below the first threshold is not considered as a danger for health.

As a refinement, the method according to the invention takes into account the natural radioactivity of the earth formation surrounding the borehole. The logging sonde actually detects gamma rays irrespective of their origin, and the nuclear measurements include natural radioactivity. Accordingly, a reference natural radioactivity level has to be determined and thus subtracted from the measured radioactivity level. The reference natural radioactivity level may be derived from one of the following sources:

natural radioactivity level measured in the tubing prior to water/oil production, i.e. prior to any scale deposit; or natural radioactivity level measured in the casing disposed in the borehole prior to any water/oil production, i.e. prior to any scale deposit; or natural radioactivity level measured in the open borehole; or assumed or estimated natural radioactivity level.

Figure 4:
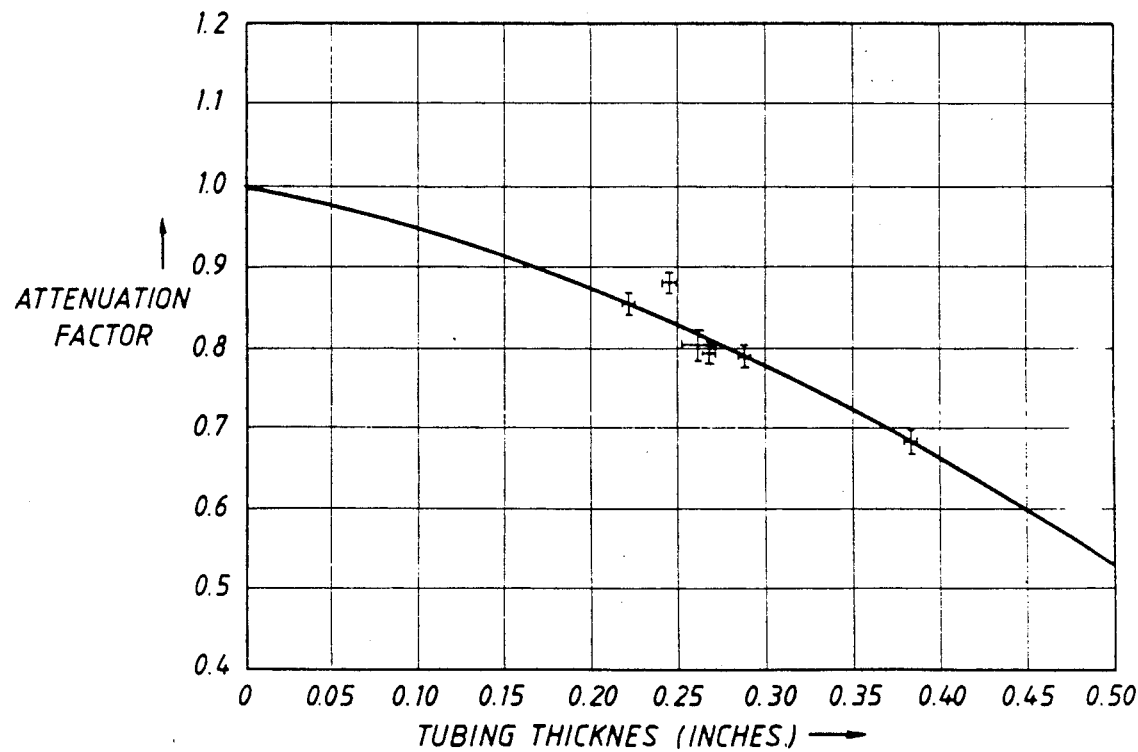
FIG. 4 is a plot of the second tubing thickness attenuation factor applied to the reference background activity level.

Any reference natural radioactivity level derived from estimation or measurements made in the borehole before the tubing is in place, has to be corrected for the tubing thickness. As a matter of fact, when carrying out scales radioactivity measurements, the natural gamma rays are detected through the tubing. This correction is made by applying to the reference natural radioactivity level "B" a second tubing thickness attenuation factor which is determined experimentally, in a manner similar to the determination of the first attenuation factor, already referred to in connection to FIG. 3. FIG. 4 shows a plot of a second attenuation factor versus tubing thickness; the different values of the second attenuation factor are determined experimentally for a set of tubing thicknesses, and thus a general relationship, shown as a curved line on FIG. 4, is inferred from these values. The relationship can be expressed in a mathematical form as:

$$CF_0 = 1 K_2 t - K_3 t^2, .$$

where "$CF_0$" is the second attenuation factor, "t" is the tubing thickness, "$K_2$" and "$K_3$" are constants representative of the relationship for a given type of detector. As a whole, the successive corrections brought to the measured radioactivity level G(API) can be expressed as:

$$\text{Corrected G(microrem/h)} = K_4 * [G(API) - B * CF_0] * CF_i$$

As an alternative, in a preferred embodiment, the natural radioactivity level "B" is not systematically subtracted from the measured radioactivity level "G(API)". Instead, one defines a second threshold greater than the first threshold already referred to (e.g. 55 microrem per hour). In other words, the second threshold is chosen so that the difference between the first and second thresholds is at least equal to or slightly greater than the natural radioactivity level. The difference is e.g. of 5 microrem/h in the example herein described.

Accordingly, any radioactivity level, as corrected for the tubing thickness, which is above the second threshold (shown as a hatched area on the logs of FIG. 5B and 6B) may constitute a health danger, and thus the corresponding tubing might constitute a hazard. As a matter of fact, the correction for natural radioactivity would lead to a radioactivity level still above the first threshold which defines the hazard limit. Thus, the natural radioactivity correction is not necessary.

Any radioactivity level corrected for tubing thickness, which is below the first threshold is indicative of a safe tubing. The correction for natural radioactivity would lead to a radioactivity level even lower, and is thus not necessary.

For any radioactivity level corrected for tubing thickness, which is between the first and the second threshold (shown as a shaded area on the logs), the user cannot determine whether the tubing is a hazard. Thus, a natural radioactivity correction has to be carried out to remove the uncertainty.

The method and apparatus according to the invention have been hereabove described in connection with scales deposited inside the tubing which is the most common case. However, there may be some instances where scales become deposited on the outside of the tubing, at least on part of it. Assuming there is no, or negligible quantities of, scales inside the tubing, the method and apparatus according to the invention allows one to detect scales on the outside of the tubing and to quantify the radioactivity level thereof, in the following manner.

The logging sonde 15 is lowered in the tubing 21 and the measurements are carried out in the manner herein above described. The gross gamma ray counts G(API) are converted in the microrem/h and corrected for both natural radioactivity and tubing thickness, according to the following formula:

Corrected G(microrem/h) = 0.0937[G(API) − B * $CF_0$]/ $CF_0$

The correction step implies in this occurrence the use of the second attenuation factor only.

What is claimed is:

1. A method for detecting and quantifying radioactive material deposited on the wall of a tubing disposed in a borehole, including the step of:
   a) detecting radiation emitted by the radioactive material by lowering through the tubing a logging tool provided with gamma ray detector means; and
   b) calculating from the radiation detected in the tubing, the radioactivity level which would be detected outside and in the vicinity of the tubing.

2. The method according to claim 1 further comprising the step of converting the radioactivity level from logging API units to microrem/h or counts per unit of time.

3. The method according to claim 1 wherein said calculating step includes correcting the detected radioactivity level for the attenuation factor due to the tubing, by determining a first tubing thickness attenuation factpr and applying said factor to the detected radioactivity level.

4. The method according to claim 3 wherein said first tubing thickness attenuation factor "$CF_i$" is equal to:

$$CF_i = 1 - K_1 t$$

where "t" is the tubing thickness, and "$K_1$" is a constant determined by experience.

5. The method according to claim 1 further comprising the step of correcting the detected radiation rays for the natural background radioactivity of the earth formations surrounding the borehole, by deducting, from the detected radioactivity level, a reference radioactivity level.

6. The method according to claim 5 wherein said reference radioactivity level is obtained from natural radioactivity level measured in the tubing prior to water/oil production, i.e. prior to any radioactive material deposit.

7. The method according to claim 5 wherein said reference radioactivity level is obtained from natural radioactivity level measured in a casing disposed in the borehole prior to any water/oil production, i.e. prior to any radioactive material deposit.

8. The method according to claim 5 wherein said reference radioactivity level is obtained from natural radioactivity level measured in the open borehole.

9. The method according to claim 5 wherein said reference radioactivity level is obtained from assumed or estimated natural radioactivity level.

10. The method according to claim 5 wherein said reference radioactivity level is corrected for tubing thickness by applying a second tubing thickness attenuation factor.

11. The method according to claim 10 wherein said second tubing thickness attenuation factor "$CF_0$" is equal to:

$$CF_0 = 1 - K_2 t - K_3 t^2,$$

where "t" is the tubing thickness and "$K_2$" and "$K_3$" are constants determined by experience.

12. The method according to claim 1 further comprising the step of recording the radioactivity level versus depth in the borehole.

13. The method according to claim 1 further comprising the step of determining a first threshold radioactivity level representative of a hazard level.

14. The method according to claim 5 further comprising the step of correcting for natural background radioactivity level only the radioactivity level above a second threshold.

15. Apparatus for detecting and quantifying radioactive material deposited on a tubing disposed in a borehole, comprising:
   a) a logging sonde, adapted to be lowered in the tubing, and comprising means for detecting and counting gamma rays emitted by the radioactive material at different depths in the borehole;
   b) means for determining, from said gamma rays, a measured radioactivity level; and c) means for calculating, from the measured radioactivity level, the radioactive level which would be detected outside and in the vicinity of the tubing.

16. The apparatus according to claim 15 further comprising means for converting the radioactivity level from logging API units to microrem/h or counts per units of time.

17. The apparatus according to claim 15 further comprising means for correcting the measured radioactivity level for the attenuation due to the tubing, by determining a first tubing thickness attenuation factor.

18. The apparatus according to claim 17, wherein said first tubing thickness attenuation factor $CF_i$ is equal to:

$$CF_i = 1 - K_1 t$$

where "t" is the tubing thickness and "$K_1$" is a constant determined by experience.

19. The apparatus according to claim 15 further comprising means for correcting said gamma rays for the natural background radioactivity of the earth formations surrounding the borehole, including means for subtracting, from the calculated radioactivity level, a reference radioactivity level.

20. The apparatus according to claim 19 wherein said reference level is obtained from a natural radioactivity level measured in the tubing prior to water/oil production, i.e. prior to any radioactive material deposit.

21. The apparatus according to claim 19 wherein said reference level is obtained from a natural radioactivity level measured in the casing prior to water/oil production, i.e. prior to any radioactive material deposit.

22. The apparatus according to claim 19 wherein said reference level is obtained from a natural radioactivity level measured in the open borehole.

23. The apparatus according to claim 19 wherein said reference level is obtained from assumed or estimated natural radioactivity level.

24. The apparatus according to claim 19 further comprising means for correcting said reference radioactivity level for the tubing thickness by applying a second tubing thickness attenuation factor.

25. The apparatus according to claim 24 wherein said second tubing thickness attenuation factor "$CF_0$" is equal to:

$$CF_0 = 1 - K_2 t \, K_3 \, t^2,$$

where "t" is the tubing thickness and "$K_2$" and "$K_3$" are constants determined by experience.

26. The apparatus according to claim 15 further comprising means for recording the radioactivity level versus depth in the borehole.

27. The apparatus according to claim 19 wherein said means for correcting for natural background radioactivity are used only for radioactivity level which is comprised between a first threshold radioactivity level and a second threshold radioactivity level.

* * * * *